United States Patent
Miki et al.

(10) Patent No.: US 9,849,932 B2
(45) Date of Patent: Dec. 26, 2017

(54) BICYCLE COMPONENT OPERATING APPARATUS

(71) Applicant: Shimano Inc., Sakai, Osaka (JP)

(72) Inventors: Yoshimitsu Miki, Osaka (JP); Kazutaka Fukao, Osaka (JP); Kentaro Kosaka, Osaka (JP)

(73) Assignee: Shimano Inc., Osaka (JP)

( * ) Notice: Subject to any disclaimer, the term of this patent is extended or adjusted under 35 U.S.C. 154(b) by 128 days.

(21) Appl. No.: 14/264,683

(22) Filed: Apr. 29, 2014

(65) Prior Publication Data

US 2015/0307154 A1    Oct. 29, 2015

(51) Int. Cl.
| | |
|---|---|
| *B62K 23/06* | (2006.01) |
| *B62K 23/02* | (2006.01) |
| *B62L 3/00* | (2006.01) |
| *B62M 25/04* | (2006.01) |
| *B62J 1/08* | (2006.01) |

(52) U.S. Cl.
CPC ............ *B62K 23/02* (2013.01); *B62K 23/06* (2013.01); *B62L 3/00* (2013.01); *B62M 25/04* (2013.01); *B62J 2001/085* (2013.01)

(58) Field of Classification Search
CPC ........ B62K 23/06; B62K 19/36; B62K 25/08; B62K 25/10; B62M 25/04; B62J 1/06; Y10T 74/20438; Y10T 74/20287
See application file for complete search history.

(56) References Cited

U.S. PATENT DOCUMENTS

| | | | | |
|---|---|---|---|---|
| 4,751,850 A | * | 6/1988 | Nagano | B62M 25/04 74/488 |
| 5,829,733 A | * | 11/1998 | Becker | B62J 1/06 248/404 |
| 7,806,022 B2 | * | 10/2010 | Hara | B62K 23/06 74/502.2 |
| 9,027,434 B2 | * | 5/2015 | Neeley | F16C 1/12 74/488 |
| 2009/0158881 A1 | | 6/2009 | Shahana | |
| 2009/0308194 A1 | | 12/2009 | Shahana | |

FOREIGN PATENT DOCUMENTS

| | | |
|---|---|---|
| CN | 103158824 A | 6/2013 |
| EP | 0814015 A2 | 12/1997 |

* cited by examiner

*Primary Examiner* — Thomas C Diaz
(74) *Attorney, Agent, or Firm* — Global IP Counselors, LLP

(57) ABSTRACT

A bicycle component operating apparatus includes a first operating device and a second operating device. The first operating device includes a base member and an operating member movably arranged with respect to the base member, and the first operating device being configured to perform an operation of at least one of a bicycle transmission component and a bicycle brake component, the base member having an attachment area. The second operating device is detachably attached to the attachment area of the base member, the second operating device being configured to perform an operation of a bicycle height adjustable seat post.

14 Claims, 6 Drawing Sheets

BICYCLE COMPONENT OPERATING APPARATUS

BACKGROUND

Field of the Invention

This invention generally relates to a bicycle component operating apparatus. More specifically, the present invention relates to a suspension control device or a height adjustable seat post control device that may be detachably attached to an operating device.

Background Information

When riding a bicycle, and in particular, a "mountain bike", it is sometimes desirable to change the height of the seat with respect to the frame or change the stiffness in the suspension system. For example, when descending steep hills, the rider many times prefers to sit lower on the bike or even to move his body further rearward such that the is positioned behind the saddle in an almost standing position. In these circumstances, it is useful to have a seat which may be adjusted into a lowered position such that the rider may sit lower or avoid having the saddle positioned at his chest level during the ride.

Moreover, based on the terrain or rider preferences, a rider may desire a stiffer or softer suspension. For example, on straight flat trails or roads a stiff suspension may be desired, while on rough trails, a softer suspension may be desired.

Conventionally, commercially available bicycles generally have height adjustable seats and adjustable suspensions. However, in many instances it is necessary to dismount to adjust these systems, or the systems are not conveniently located.

Bicycle racers and others who desire an uninterrupted riding experience may find such starting and stopping of the bicycle or an inconveniently positioned adjustment member to be unproductive, inconvenient, and unpleasant. Thus, there is a need for improved automatic seat post adjustment devices and suspension adjustment devices for a bicycle whose seat height and/or suspension may be easily adjusted while the bicycle is being ridden.

SUMMARY

Generally, the present disclosure is directed to a bicycle component operating apparatus. One object is to provide a bicycle component operating apparatus in which a bicycle height adjustable seat post or a bicycle suspension can be altered, the bicycle component operating apparatus being detachably attached to a first operating device, such as a shifting device or a braking device.

In view of the state of the known technology and in accordance with a first aspect of the present disclosure, a bicycle component operating apparatus is provided. The first operating device includes a base member and an operating member movably arranged with respect to the base member, and the first operating device being configured to perform an operation of at least one of a bicycle transmission component and a bicycle brake component, the base member having an attachment area. The second operating device is detachably attached to the attachment area of the base member, the second operating device being configured to perform an operation of a bicycle height adjustable seat post.

In accordance with a second aspect of the present invention, the bicycle component operating apparatus according to the first aspect is configured so that the attachment area has an opening, and the second operating device includes an attachment part that is detachably disposed in the opening.

In accordance with a third aspect of the present invention, the bicycle component operating apparatus according to the second aspect is configured so that the base member includes an additional opening communicating with the opening, the opening being sized and configured to receive the attachment part of the second operating device, the additional opening being sized and configured to receive a locking member which extends through the additional opening and engages the attachment part of the second operating device to lock the attachment part of the second operating device in the opening.

In accordance with a fourth aspect of the present invention, the bicycle component operating apparatus according to the third aspect is configured so that the attachment part of the second operating device includes a depression, and the locking member engages the depression of the attachment part.

In accordance with a fifth aspect of the present invention, the bicycle component operating apparatus according to the second aspect is configured so that the opening includes an internal thread portion, and the attachment part includes an external thread portion configured to engage the internal thread portion.

In accordance with a sixth aspect of the present invention, the bicycle component operating apparatus according to the second aspect is configured so that the attachment part of the second operating device is detachably retained in the opening by a snap-fit connection.

In accordance with a seventh aspect of the present invention, the bicycle component operating apparatus according to the first aspect is configured so that one of the attachment area and the second operating device has at least one threaded hole, the other of the attachment area and the second operating device has through hole, and the second operating device is attachable to the attachment area with at least one screw that passes through the trough hole and is threaded into the threaded hole.

In accordance with an eighth aspect of the present invention, the bicycle component operating apparatus according to the first aspect is configured so that the second operating device is adjustably attached to the attachment area of the base member.

In accordance with a ninth aspect of the present invention, the bicycle component operating apparatus according to the eighth aspect is configured so that the second operating device includes an attachment part detachably attached to the attachment area of the base member and an operating member having a user interface surface, the user interface surface being configured to face a rearward direction in a state where the bicycle component operating apparatus is mounted on a bicycle.

In accordance with a tenth aspect of the present invention, the bicycle component operating apparatus according to the ninth aspect is configured so that the operating member of the second operating device is configured to be movable in a forward direction in the state where the bicycle component operating apparatus is mounted on the bicycle.

In accordance with an eleventh aspect of the present invention, the bicycle component operating apparatus according to the first aspect is configured so that the second operating device includes an attachment part detachably attached to the attachment area of the base member and an operating member having a user interface surface, the user interface surface being configured to face a rear direction in a state where the bicycle component operating apparatus is mounted on a bicycle.

In accordance with a twelfth aspect of the present invention, the bicycle component operating apparatus according to the first aspect is configured so that the second operating device is configured to electrically control the bicycle height adjustable seat post.

In accordance with a thirteenth aspect of the present invention, the bicycle component operating apparatus according to the first aspect is configured so that the second operating device is configured to operate a cable connected to bicycle height adjustable seat post.

In accordance with a fourteenth aspect of the present invention, the bicycle component operating apparatus according to the first aspect is configured so that the first operating device is configured to operate the bicycle transmission component.

In accordance with a fifteenth aspect of the present invention, the bicycle component operating apparatus according to the fourteenth aspect is configured so that the first operating device is configured to electrically control the bicycle transmission component.

In accordance with a sixteenth aspect of the present invention, the bicycle component operating apparatus according to the fourteenth aspect is configured so that the first operating device is configured to operate a cable connected to the bicycle transmission component.

In accordance with a seventeenth aspect of the present invention, the bicycle component operating apparatus according to the first aspect is configured so that the first operating device is configured to operate the bicycle brake component.

In accordance with an eighteenth aspect of the present invention, the bicycle component operating apparatus according to the seventeenth aspect is configured so that the first operating device is configured to be connected to a fluid hose so as to hydraulically operate the bicycle brake component.

In accordance with a nineteenth aspect of the present invention, a bicycle component operating apparatus basically comprises a first operating device and a second operating device. The first operating device includes a base member and an operating member movably arranged with respect to the base member, the first operating device being configured to perform an operation of at least one of a bicycle transmission component and a bicycle brake component, the base member having an attachment area having an opening. The second operating device including an attachment part that is detachably disposed in the opening of the base member.

In accordance with a twentieth aspect of the present invention, a bicycle component operating apparatus basically comprises a first operating device and a second operating device. The first operating device including a base member which has a clamp configured to be coupled to a handlebar, a main body connected to the clamp and an operating member movably arranged with respect to the base member, the first operating member device configured to perform an operation of at least one of a bicycle transmission component and a bicycle brake component, the main body having an attachment area. The second operating device including an attachment part that is detachably and adjustably attached to the attachment area of the main body.

Also other objects, features, aspects and advantages of the disclosed bicycle component operating apparatus will become apparent to those skilled in the art from the following detailed description, which, taken in conjunction with the annexed drawings, discloses one embodiment of the bicycle component operating apparatus.

BRIEF DESCRIPTION OF THE DRAWINGS

Referring now to the attached drawings which form a part of this original disclosure.

DETAILED DESCRIPTION OF EMBODIMENTS

Figure 1:
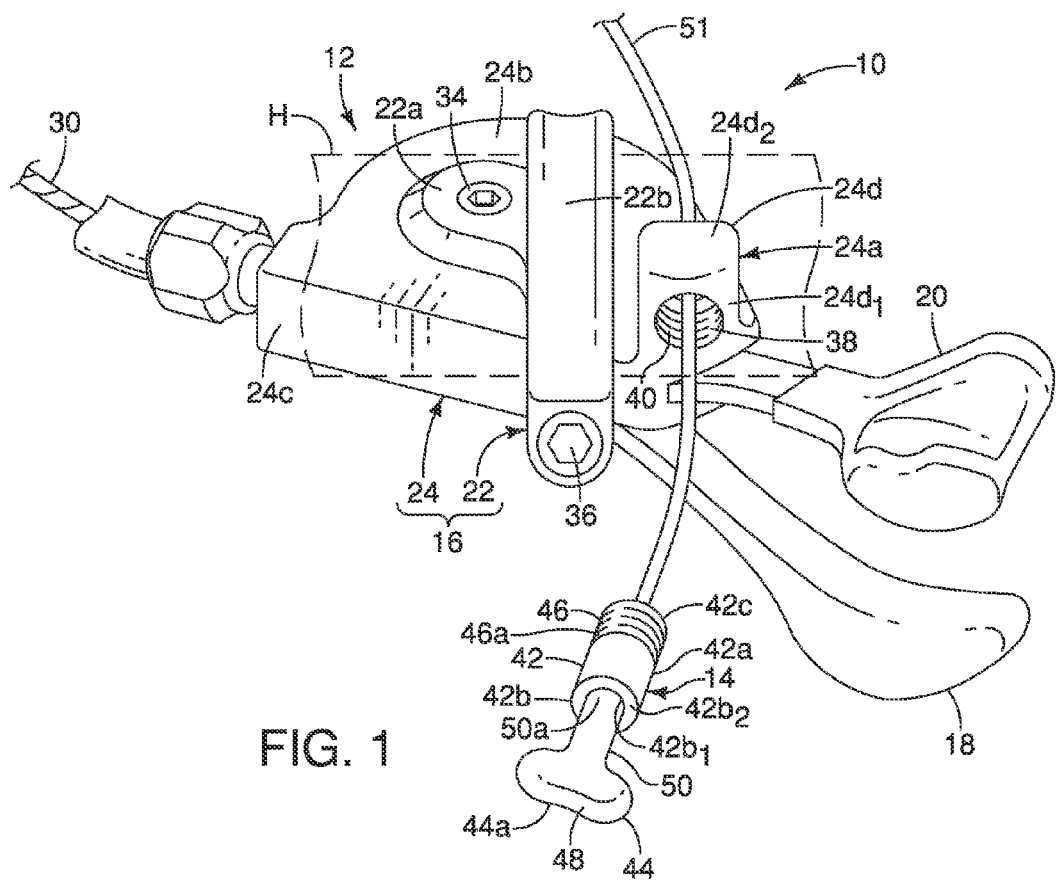
FIG. 1 is an exploded top perspective view of a bicycle component operating apparatus in accordance with one illustrated embodiment.
Figure 2:
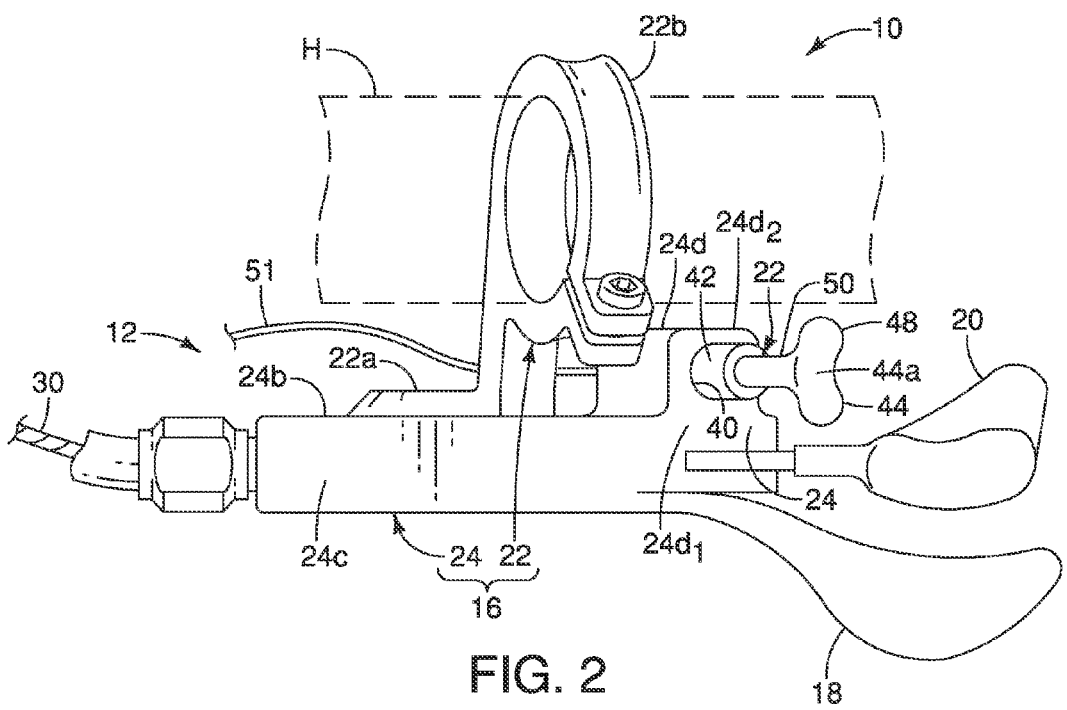
FIG. 2 is a rear view of the bicycle component operating apparatus of FIG. 1 in an assembled state.
Figure 3:
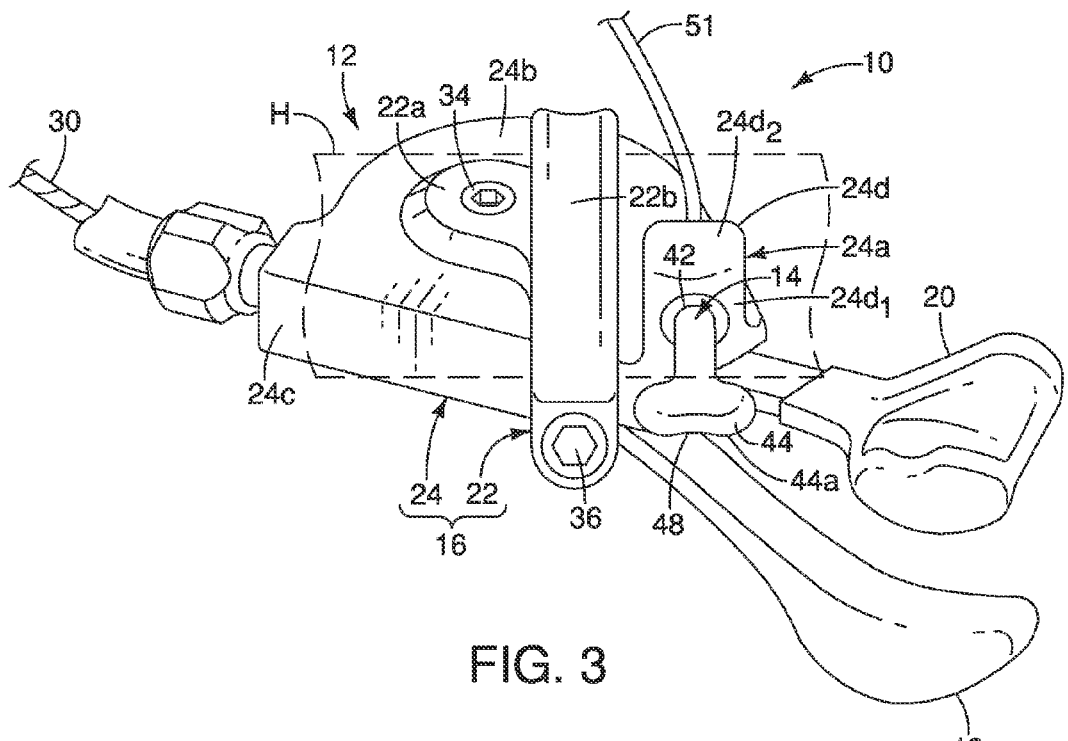
FIG. 3 is a top perspective view of the bicycle component operating apparatus of FIG. 2.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1-4, a bicycle component operating apparatus 10 in accordance with a first embodiment is illustrated. The bicycle component operating apparatus 10 is generally coupled to a handlebar H of a bicycle. In this embodiment, the bicycle is a mountain bike with a substantially straight handlebar H. However, the bicycle component operating apparatus 10 may be attached to any type of handle bar desired in any manner desired.

The bicycle component operating apparatus 10 comprises a first operating device 12 and a second operating device 14. The first operating device 12 includes a base member 16 and an operating member 18 movably arranged with respect to the base member 16. The first operating device 12 is configured to perform an operation of at least one of a bicycle transmission component and a bicycle brake component (not shown both). In one embodiment, the first operating device 12 is configured to perform an operation of the bicycle transmission component. In more detail, the first operating device 12 is configured to operate a cable 30 connected to the bicycle transmission component. The operating member 18 performs a cable pulling operation for pulling the cable 30. The operating member 18 is configured as a lever so as to pivotally move with respect to the base member 16. The first operating device 12 further includes another operating member 20 configured to perform a cable release operation for releasing the cable 30. The operating member 20 is configured as a lever so as to pivotally move with respect to the base member 16. However, the operating members 18 and 20 are not limited to the lever. Any kind of operating members, e.g. a slidable switch, button and so on, can be applied to the operating members 18 and 20. Further, it is possible to have one operating member perform both operations, thus, two operating members are not necessarily required. The base member 16 has a clamp or bracket 22 configured to be coupled to the handlebar H, and a main body or housing 24 connected to the clamp 22. Furthermore, the first operating device 12 can be configured to electrically control the bicycle transmission component or be connected to a fluid hose so as to hydraulically operate the bicycle transmission component.

In the illustrated embodiment, the first operating device 12 is a shift operating device including a cable operating unit which is configured to pull or release the cable 30. The cable operating unit is coupled to a derailleur which is one example of the bicycle transmission component, via the cable 30. The cable 30 is an inner cable of a conventional Bowden cable including an outer casing which at least partially covers the inner cable. The cable operating unit can be constructed in any conventional manner and is therefore not discussed in detail herein.

In this embodiment, the main body or housing 24 of the base member 16 encloses at least a portion of the operating members 18 and 20. The main body 24 of base member 16 includes an attachment area 24a, a top surface 24b and a rear surface 24c that extends generally transverse to the top surface 24b. The clamp or bracket 22 attaches the main body 24 to the handlebar H. The clamp 22 preferably has an attachment portion 22a and a clamping portion 22b. The attachment portion 22a is detachably attached to the top surface 24b of the main body 24 with a screw 34 or any other suitable fastening member. The clamping portion 22b extends from the attachment portion 22a and has a generally circular configuration. The clamping portion 22b clamps the handlebar H using a screw 36 or other fastening member, as is known in the art.

The main body 24 of the base member 16 includes an attachment portion 24d that extends or protrudes upwardly from the top surface 24b and includes the attachment area 24a. The attachment portion 24d includes a rear surface $24d_1$ and a top surface $24d_2$. In this embodiment, the attachment area 24a has an opening 38 provided in the rear surface $24d_1$ of the attachment portion 24d of the base member 16. The opening 38 includes an internal thread portion 40. That is, the opening 38 is substantially circular and has an inner surface 38a (FIG. 4) extending inwardly from the rear surface $24d_1$ of the attachment portion 24d towards an inner portion of the base member 16.

The second operating device 14 includes a housing 42 and an operating member 44. The housing 42 has generally cylindrical shape. The housing 42 has an outer surface 42a, a first end portion 42b and a second end portion 42c. The first end portion 42b is axially opposite to the second end portion 42c. Preferably, the second end portion 42c includes an attachment part 46. In this embodiment, the attachment part 46 includes an external or male thread portion 46a on the outer surface 42a. The external thread portion 46a is configured to engage with the internal thread portion 40 of the opening 38. Accordingly, the external thread portion 46a may be disposed on at least a portion of the outer surface 42a of the housing 42 so as to encircle the housing 42.

The first end portion 42b may include an opening $42b_1$ disposed in an end surface $42b_2$. The operating member 44 extends through the opening $42b_1$. The operating member 44 has a user interface surface 44a. The user interface surface 44a is configured to face a rearward direction in a state where the bicycle component operating apparatus 10 is mounted on the bicycle. In this embodiment, the user interface surface 44a of the operating member 44 preferably is on a gripping portion 48, and a shaft 50 extends from the gripping portion 48, and enables a user to grip and operate the second operating device 14. The shaft 50 is slidable relative to the housing 42 and extends into the opening $42b_1$ in the first end portion 42b, such that the gripping portion 48 protrudes from or is positioned outside of the housing 42. Accordingly, the operating member 44 of the second operating device 14 is configured to be movable in a forward direction and a rearward direction in the state where the bicycle component operating apparatus 10 is mounted on a bicycle.

The second operating device 14 is configured to perform an operation of a bicycle height adjustable seat post (not shown). In more detail, the second operating device 14 is configured to operate a cable 51 connected to the bicycle height adjustable seat post. Thus, as is understood, an end 50a of the shaft 50 opposite the gripping portion 48 is connected to a seat post height adjustment mechanism (not shown), via cable 51 (such as a Bowden cable). Accordingly, when the shaft 50 of the second operating device 14 is moved relative to the housing 42 (see arrow A in FIG. 4), the height of the seat (not shown) of the bicycle is moved. The bicycle height adjustable seat post can be constructed in any conventional manner and is therefore not discussed in detail herein.

The second operating device 14 can be configured to perform an operation of a bicycle suspension (now shown). Thus, as is understood, the end 50a of the shaft 50 opposite the gripping portion 48 is connected to a bicycle suspension (not shown), via cable 51 (such as a Bowden cable). Accordingly, when the shaft 50 of the second operating device 14 is moved relative to the housing 42, the stiffness of the bicycle suspension is altered. The bicycle suspension can be constructed in any conventional manner and is therefore not discussed in detail herein.

Figure 4:
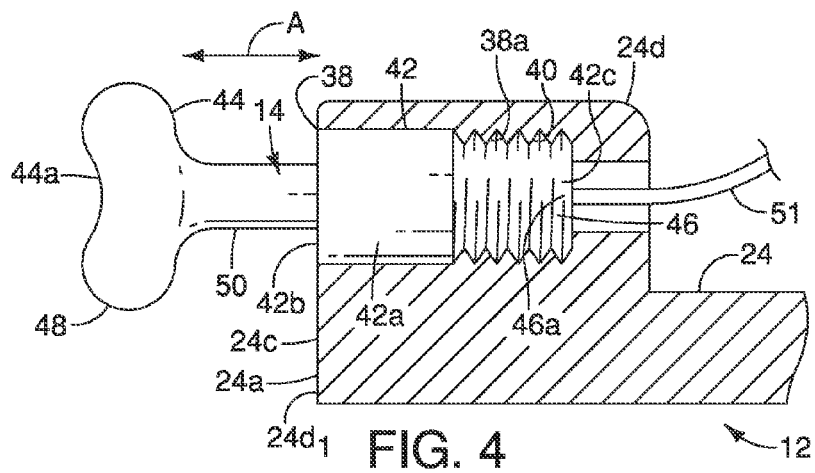
FIG. 4 is a partial side view in section of the bicycle component operating apparatus of FIG. 2.

The attachment part 46 of the second operating device 14 is detachably attached to the attachment area 24a of the base member 16. In this embodiment, the second operating device 14 is detachably disposed in the opening 38 of the base member 16, as shown in FIG. 4. That is, the second operating device 14 is inserted into the opening 38 of the base member 16. The external thread portion 46a of the attachment part 46 engages with the internal thread portion 40 of the opening 38 to secure the second operating device 14 in the opening 38. The threaded attachment enables the second operating device 14 to be adjusted in a longitudinal direction within the opening 38. Thus, the second operating device 14 is detachably and adjustably attached to the attachment area 24a of the main body 24 of the base member 16.

Figure 5:
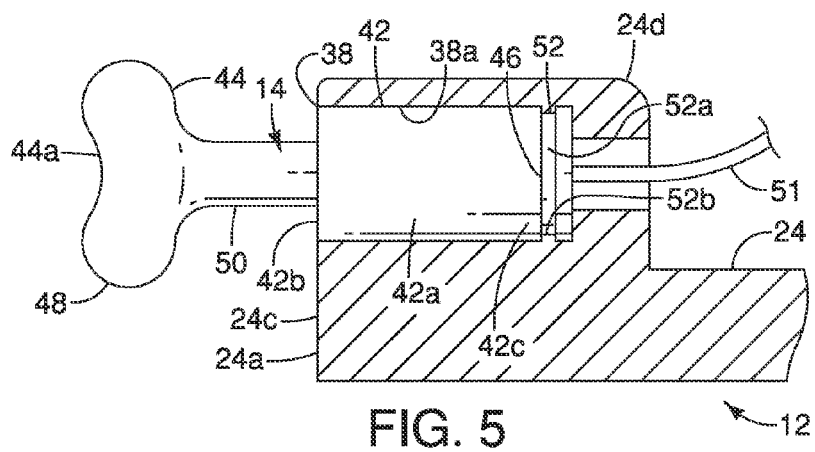
FIG. 5 is a partial side view in section of another embodiment of the bicycle component operating apparatus of FIG. 1 in an assembled state.

In another embodiment, as shown in FIG. 5, the attachment part 46 of the second operating device 14 is detachably retained in the opening 38 by a snap-fit connection 52. Thus, in this embodiment male and female threads may not be necessary.

In this embodiment, the snap fit connection 52 includes a radial groove 52a on the second end portion 42c of the housing 42 of the second operating device 14, and a protrusion 52b on the inner surface 38a of the opening 38. As is understood, the protrusion 52b may be on the housing 42 of the second operating device 14 and the groove 52a may be on the inner surface 38a. Moreover, the snap-fit connection 52 may be any suitable snap fit connection desired.

Accordingly, the second operating device 14 can be removed for servicing or replacement. Additionally, the second operating device 14 can be removed if the bicycle does not include the height adjustable seat post. In this embodiment, the opening 38 in the base member 16 may be filled (or not) in any suitable manner.

Figure 6:
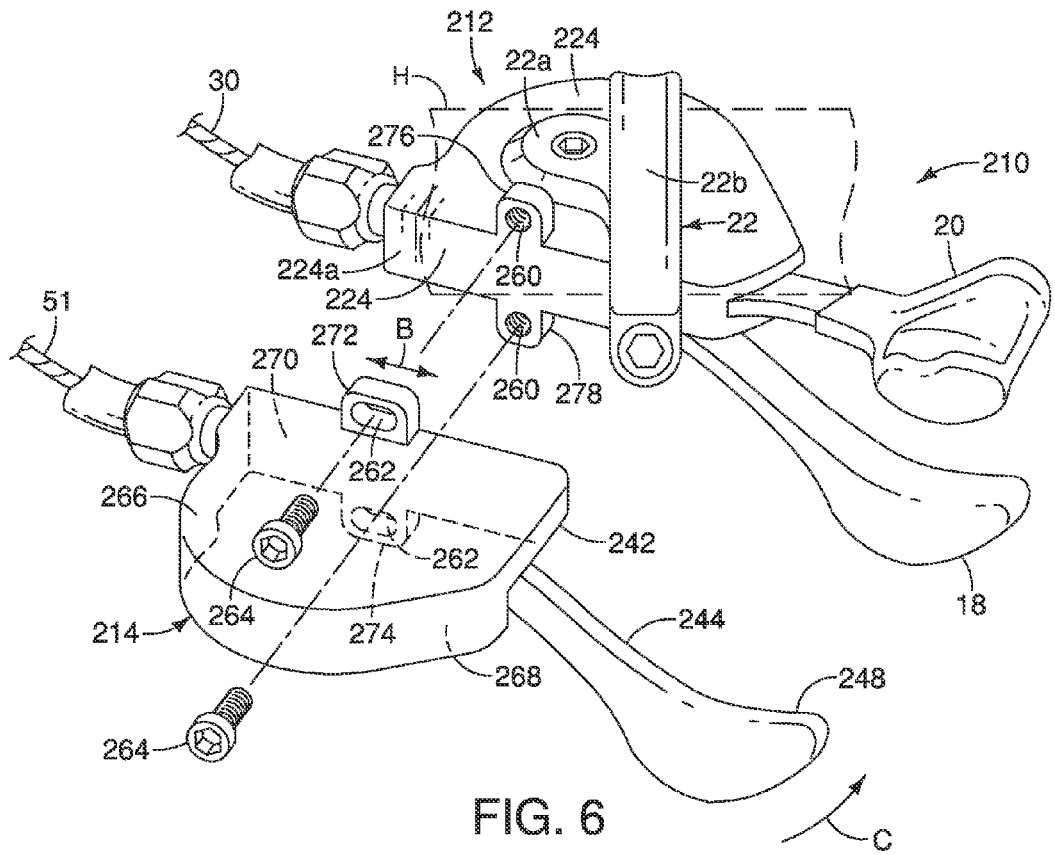
FIG. 6 is an exploded top perspective view of a bicycle component operating apparatus in accordance with another illustrated embodiment.
Figure 7:
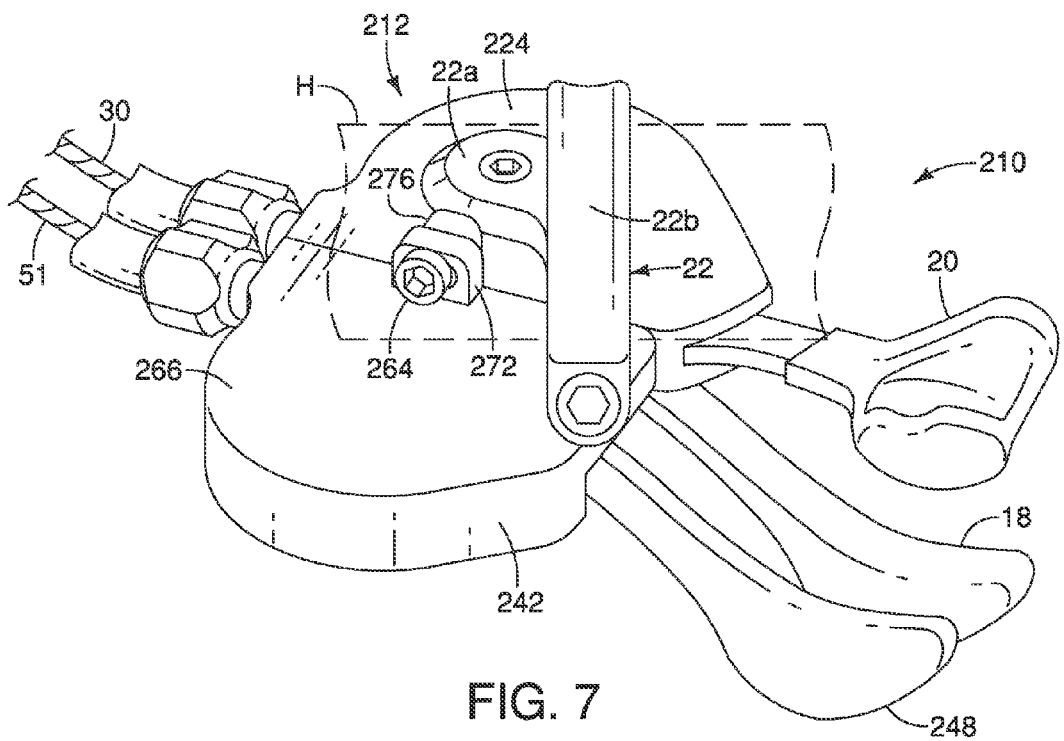
FIG. 7 is top perspective view of the bicycle component operating apparatus of FIG. 6 in an assembled state.

Referring now to FIGS. 6 and 7, a bicycle component operating apparatus 210 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In this embodiment, one of the attachment area 224a of the main body 224 and the second operating device 214 has at least one threaded hole 260, the other of the attachment area 224a and the second operating device 214 has a through hole 262, and the second operating device 214 is attachable to the attachment area 224a by at least one screw 264 that passes through the through hole 262 and is threaded into the threaded hole 260.

In one embodiment, the second operating device 214 includes a main body or housing 242 and an operating member 244 at least partially enclosed in the main body 242. The main body 242 has an upper surface 266, a lower surface 268 and an attachment part (attachment surface) 270. Flanges 272 and 274 extend from the upper surface 266 and the lower surface 268, respectively. The flanges 272 and 274 preferably extend substantially perpendicular from the upper surface 266 and the lower surface 268, respectively. The flanges 272 and 274 are configured so as to be substantially rectangular in shape. In this embodiment, the flange 272 extends in an upward direction and the flange 274 extends in a downward direction. The flanges 272 and 274 have the through hole 262 respectively. The through holes 262 extend in a direction (lateral direction) B shown in FIG. 6 as an arrow mark so as to adjustably dispose the second operating device 214 in the direction B.

As is illustrated in FIGS. 6 and 7, preferably, the attachment area 224a of the first operating device 212 has flanges 276 and 278 corresponding to flanges 272 and 274, respectively. The flange 276 extends in an upward direction and the flange 278 extends in a downward direction. Each of the flanges 276 and 278 has threaded hole 260.

In this embodiment, screws 264 are inserted through the through holes 262 in the second operating device 214 and engage the threads in the threaded holes 260 in the first operating device 212. The screws 264 enable the second operating device 214 to be detachably attached to the first operating device 212 and also be adjustable in the direction B.

Similarly, to the first embodiment, in this embodiment, the first operating device 212 is configured to operate a bicycle transmission component (not shown) by the cable 30. The first operating device 212 can be configured to electrically control the bicycle transmission component. In another embodiment, the first operating device 212 can be configured to operate a bicycle brake component (not shown).

The second operating device 214 is configured to perform an operation of a bicycle height adjustable seat post. In more detail, the second operating device 214 is configured to operate the cable 51 connected to bicycle height adjustable seat post. Thus, as is understood, the end of the operating member 244 of the second operating device 214 opposite the user interface surface 248 is connected to a seat post height adjustment mechanism (not shown), via the cable 51 (such as a Bowden cable). Accordingly, when the operating member 244 of the second operating device 214 is moved relative to the main body in a direction C (FIG. 6), the height of the seat (not shown) of the bicycle is moved. Similarly, to the first embodiment, the user interface surface 248 is configured to face a rearward direction in a state where the bicycle component operating apparatus 210 is mounted on the bicycle. Similarly, to the first embodiment, the second operating device 214 can be is configured to perform an operation of a bicycle suspension (now shown).

Figure 8:
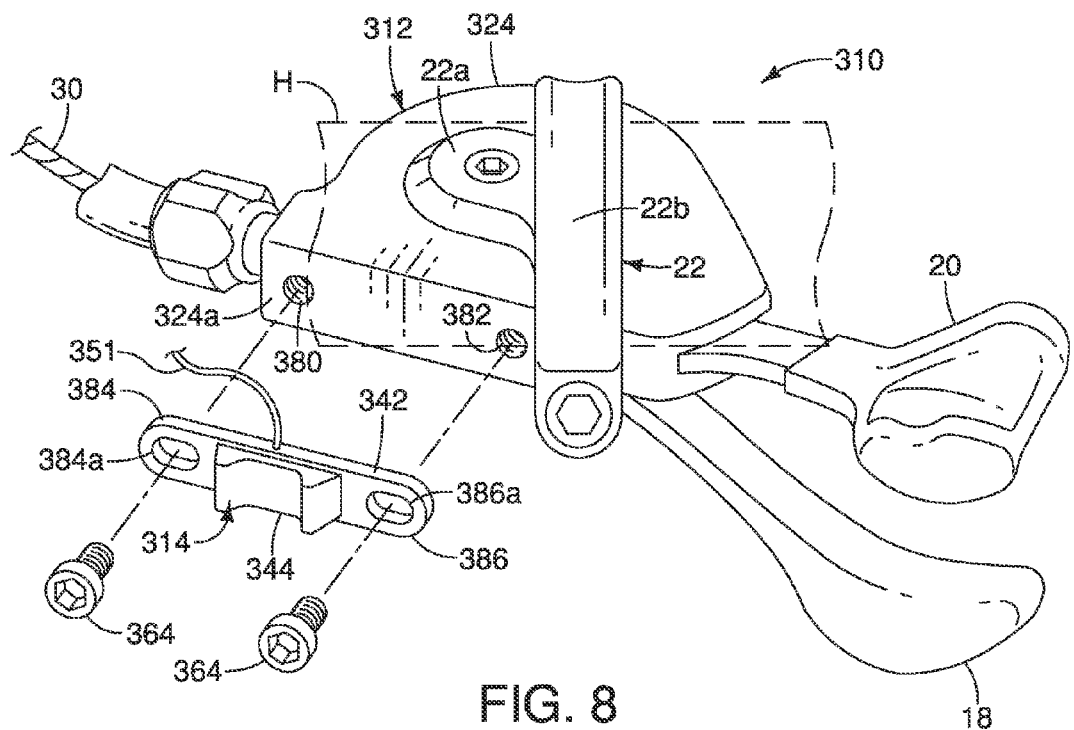
FIG. 8 is an exploded top perspective view of a bicycle component operating apparatus in accordance with another illustrated embodiment.
Figure 9:
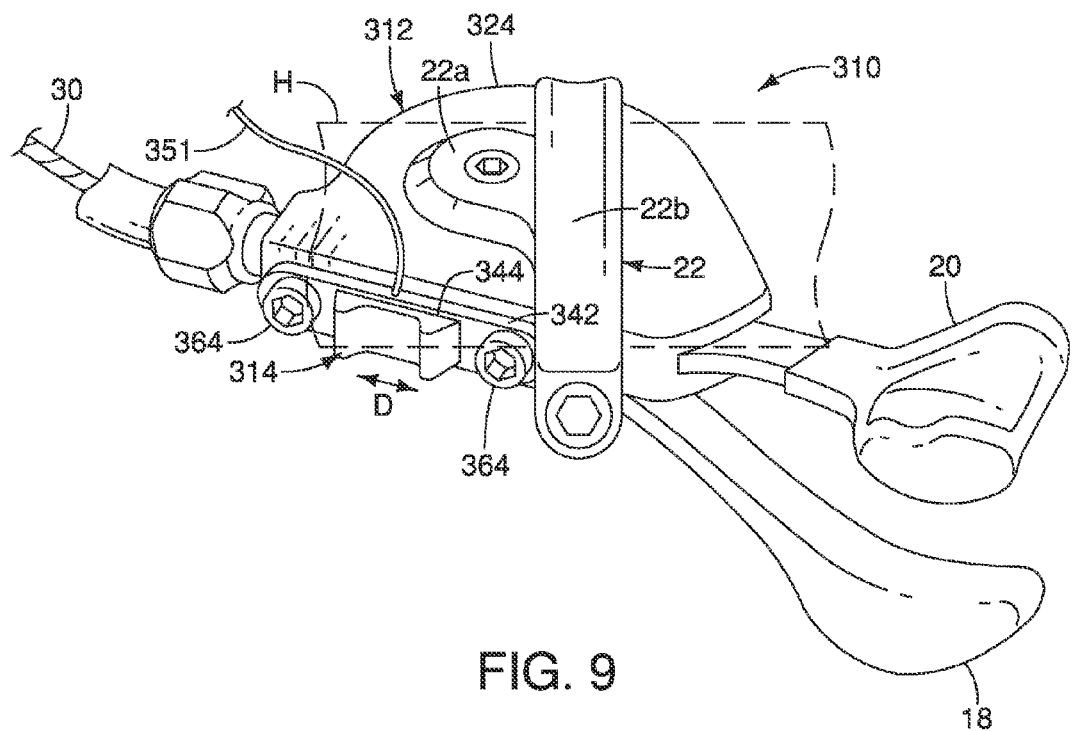
FIG. 9 is top perspective view of the bicycle component operating apparatus of FIG. 8 in an assembled state.

Referring now to FIGS. 8 and 9, a bicycle component operating apparatus 310 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

As is illustrated in FIGS. 8 and 9, preferably, the attachment area (attachment surface) 324a of the main body 324 has threaded holes 380 and 382. The threaded holes 380 and 382 are offset from each other in a direction (lateral direction) D shown in FIG. 9 as an arrow mark.

The second operating device 314 has a support member 342. The support member 342 has first protrusion 384 and a second protrusion 386 extending in the direction D, respectively. The first protrusion 384 has a through hole 384a, and the second protrusion 386 has a through hole 386a. The through holes 384a and 386a are arranged and configured so as to correspond to the threaded holes 380 and 382 in the attachment area 324a of the first operating device 312. Screws 364 are inserted through the through holes 384a and 386a in the second operating device 314 and engage with the threaded holes 380 and 382 of the first operating device 312, respectively.

Similarly, to the first embodiment, in this embodiment, the first operating device 312 is configured to operate the bicycle transmission component by the cable 30. In this embodiment, the second operating device 314 is configured to perform an operation of a bicycle height adjustable seat post. In more detail, the second operating device 314 is configured to electrically control a bicycle height adjustable seat post via the electrical line 351. The second operating device 314 includes an electric switch (not shown) provided on the support member 342, and an operating member 344 movably supported on the support member 342 to operate the electric switch in a pivotal manner, in a slide manner or any desired manner. The electric switch is configured to provide electric signal in response to a movement of the operating member 344 relative to the support member 342, to move the height of the seat (not shown). The electric seat post height adjustment mechanism of the bicycle height adjustable seat post can be constructed in any conventional manners and is therefore not discussed in detail herein. The second operating device 314 can be connected with a bicycle suspension. In other words, the second operating device 314 can be configured to electrically control a bicycle suspension (now shown).

Figure 10:
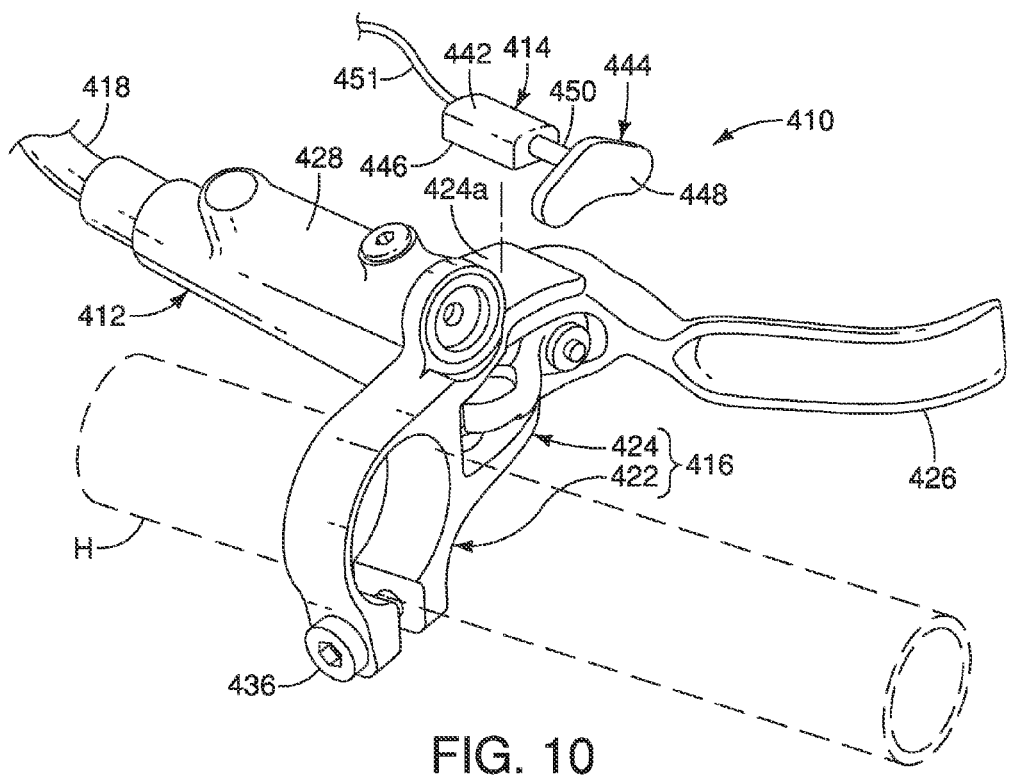
FIG. 10 is an exploded top perspective view of a bicycle component operating apparatus in accordance with another illustrated embodiment.
Figure 11:
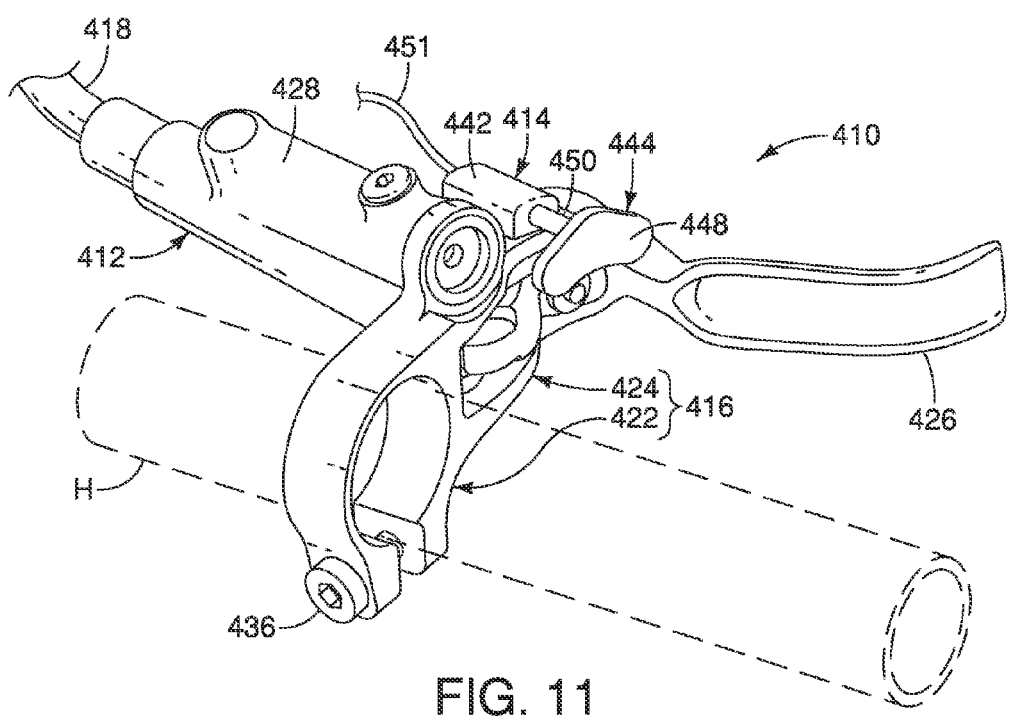
FIG. 11 is top perspective view of the bicycle component operating apparatus of FIG. 10 in an assembled state.

Referring now to FIGS. 10 and 11, a bicycle component operating apparatus 410 in accordance with a fourth embodiment will now be explained. As is illustrated in FIGS. 10 and 11, the bicycle component operating apparatus 410 comprises a first operating device 412 and a second operating device 414. The first operating device 412 is configured to perform an operation of a bicycle brake component (not shown). The first operating device 412 includes a base member 416 and an operating member 426 movably arranged with respect to the base member 416.

The first operating device 412 is a hydraulic brake operating device and is coupled to a hydraulic brake component (not shown), such as a disc caliper brake, via a hydraulic hose 418. The base member 416 has a clamp 422 being configured to be coupled to a handlebar H and a main body 424 being connected to the clamp 422. Since the clamp 422 clamps the handlebar H by using a screw 436 in a same manner as the clamp 22 of the first embodiment, the clamp 422 is not discussed in detail herein for the sake of brevity. The main body 424 has a master cylinder unit 428 having a piston (not shown), and an attachment area 424a. The master cylinder unit 428 can be constructed in any conventional manners and is therefore not discussed in detail herein. In this embodiment, the attachment area 424a is provided on a top surface of the main body 424 which is above the operating member 426.

The second operating device 414 is configured to perform an operation of a bicycle height adjustable seat post. In more detail, the second operating device 414 is configured to operate a cable 451 connected to the bicycle height adjustable seat post. The second operating device 414 includes a housing 442 and an operating member 444. The housing 442 has generally box shape having rectangular surfaces. The housing 442 includes an attachment part 446 provided at a bottom flat surface. The attachment part 446 is detachably attached to the attachment area 424a of the base member 416. In this embodiment, the attachment part 446 of the second operating device 414 is detachably disposed to the attachment area 424a in any conventional manner, such as screws, tape or glue. The operating member 444 includes a user interface portion 448 having an user interface surface, and a shaft 450 slidably disposed on the housing 442 and supporting the user interface portion 448. The second operating device 414 can be configured to perform an operation of a bicycle suspension.

Figure 12:
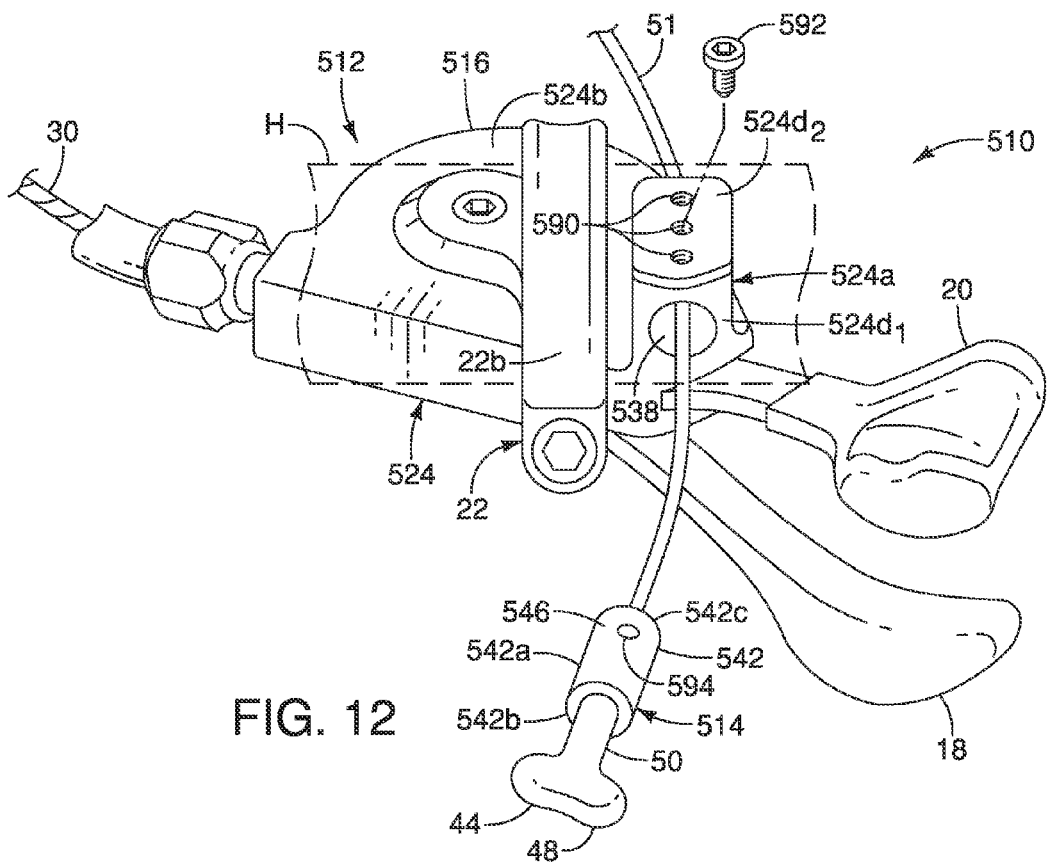
FIG. 12 is an exploded top perspective view of a bicycle component operating apparatus in accordance with another illustrated embodiment.
Figure 13:
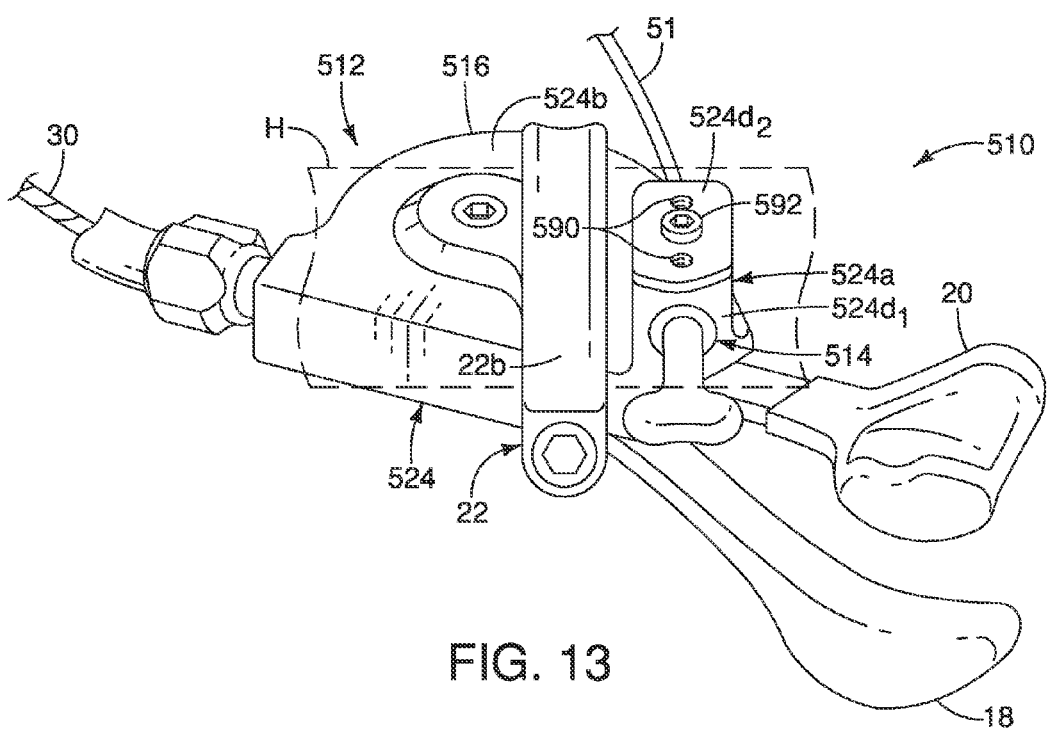
FIG. 13 is top perspective view of the bicycle component operating apparatus of FIG. 12 in an assembled state.

Referring now to FIGS. 12 and 13, a bicycle component operating apparatus 510 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

As is illustrated in FIGS. 12 and 13, the bicycle component operating apparatus 510 comprises a first operating device 512 and a second operating device 514. The first operating device 512 includes a base member 516 and operating members 18 and 20 movably arranged with respect to the base member 516. The base member has the clamp 22 and a main body 524. An attachment area 524a is provided on the main body 524. Except for a difference of construction between the attachment areas 24a and 524a, the first operating device 512 is identical with the first operating device 12 of the first embodiment.

The attachment area 524a extends or protrudes upwardly from the top surface 524b of the main body 524. The attachment area 524a includes a rear surface $524d_1$ and a top surface $524d_2$. The attachment area 524a has an opening 538 provided in the rear surface $524d_1$ of the attachment area 524a. The main body 524 of the base member 516 includes additional openings 590 communicating with the opening 538. The additional openings 590 extend through the top surface $524d_2$ to the opening 538. The additional openings 590 are configured as threaded holes respectively. In this embodiment, the attachment area 524a has three additional openings 590, as shown in FIGS. 12 and 13. Each of the additional openings 590 is sized and configured to receive a locking member or screw 592.

The second operating device 514 may include a housing 542 and an operating member 44. The housing 542 has generally cylindrical shape. The housing 542 has an outer surface 542a, a first end portion 542b and a second end portion 542c. The first end portion 542b is axially opposite to the second end portion 542c. Preferably, the second end portion 542c includes an attachment part 546. In this embodiment, the attachment part 546 of the second operating device 514 includes a depression 594. Although the attachment part 546 is preferably on the second end portion 542c of the housing 542, the attachment part 546 may be located on any suitable portion of the housing 542. The second operating device 514 is configured to perform an operation of one of a bicycle height adjustable seat post and a bicycle suspension by the cable 51.

The attachment part 546 of the second operating device 514 is detachably attached to the attachment area 524a of the base member 516. In this embodiment, the second operating device 514 is detachably disposed in the opening 538 of the base member 516. That is, the opening 538 is sized and configured to receive the attachment part 546 of the second operating device 514. The locking member 592 extends through the additional opening 590 and engages the attachment part 546 of the second operating device 514 to lock the attachment part 546 of the second operating device 514 in the opening 538. In particular, the locking member 592 engages the depression 594 of the attachment part 546. Moreover, the locking member 592 may be inserted into one of a plurality of the additional openings 590. Thus, the second operating device 514 is adjustably attached to the attachment area 524a of the base member 516.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "portion," "member" or "element" when used in the singular can have the dual meaning of a single part or a plurality of parts unless otherwise stated. As used herein, the following directional terms, "forward", "rearward", "front", "rear", "up", "down", "upward", "downward", "top", "side", "transverse" and "horizontal" as well as any other similar directional terms refer to those directions of a bicycle in an upright, riding position and equipped with the bicycle component operating apparatus. Accordingly, these directional terms, as utilized to describe the bicycle component operating apparatus should be interpreted relative to a bicycle in an upright riding position on a horizontal surface and that is equipped with the bicycle component operating apparatus. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "connected", "coupled", "mounted", and their derivatives. Finally, terms of degree such as "substantially", as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function. Components that are shown directly connected or contacting each other can have intermediate structures disposed between them so long as the changes do not substantially affect their intended function. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component operating apparatus comprising:
a first operating device including a base member and an operating member movably arranged with respect to the base member, the first operating device being configured to perform an operation of at least one of a bicycle transmission component and a bicycle brake component, the base member having an attachment area having; an attachment area opening having a first axial end with a first center line and a second axial end with a second center line, the first and second center lines being linearly aligned;
a cable configured to operate a bicycle component; and
a second operating device being connected to the cable, the second operating device being detachably attached to the attachment area of the base member, the second operating device having an operating member and a housing having a housing opening with a first axial end and a second axial end, the operating; member of the second operating; device protruding from the first axial end of the housing and the first axial end of the attachment area opening, the cable protruding from the second axial end of the housing opening and the second axial end of the attachment area opening, the operating member of the second operating device extending through a housing opening and being linearly slidable within the housing opening to move the operating member of the second operating device relative to the housing such that the second operating device is configured to perform a height adjustment operation of a bicycle height adjustable seat post.

2. The bicycle component operating apparatus according to claim 1, wherein
the second operating device includes an attachment part that is detachably disposed in the attachment area opening.

3. The bicycle component operating apparatus according to claim 2, wherein
the base member includes an additional opening communicating with the attachment area opening, the attachment area opening being sized and configured to receive the attachment part of the second operating device, the additional opening being sized and configured to receive a locking member which extends through the additional opening and engages the attachment part of the second operating device to lock the attachment part of the second operating device in the attachment area opening.

4. The bicycle component operating apparatus according to claim 3, wherein
the attachment part of the second operating device includes a depression, and the locking member engages the depression of the attachment part.

5. A bicycle component operating apparatus comprising:
a first operating device including a base member and an operating member movably arranged with respect to the base member, the first operating device being configured to perform an operation of at least one of a bicycle transmission component and a bicycle brake component, the base member having an attachment area having an attachment area opening with a first axial end, a second axial end and an internal thread portion;
a cable configured to operate a bicycle component; and
a second operating device being connected to the cable and having an attachment part including an external thread portion configured to engage the internal thread portion such that the attachment part that is detachably disposed in the attachment area of the base member, the second operating device having an operating member and a housing having a housing opening with a first axial end and a second axial end, the operating member of the second operating device protruding from the first axial end of the housing and the first axial end of the attachment area opening; the cable protruding from the second axial end of the housing opening and the second axial end of the attachment area opening, the operating member of the second operating device extending through a housing opening and being linearly slidable within the housing opening to move the operating member of the second operating device relative to the housing such that the second operating device is configured to perform a height adjustment operation of a bicycle height adjustable seat post.

6. A bicycle component operating apparatus comprising:
a first operating device including a base member and an operating member movably arranged with respect to the base member, the first operating device being configured to perform an operation of at least one of a bicycle transmission component and a bicycle brake component, the base member having an attachment area having an attachment area opening with a first axial end, a second axial end and an internal thread portion;
a cable configured to operate a bicycle component; and
a second operating device being connected to the cable and having an attachment part detachably retained in the attachment area opening by a snap-fit connection, the second operating device having an operating member and a housing having a housing opening with a first axial end and a second axial end, the operating member of the second operating device protruding from the first axial end of the housing and the first axial end of the attachment area opening, the cable protruding from the second axial end of the housing opening and the second axial end of the attachment area opening, the operating member of the second operating device extending through a housing opening and being linearly slidable within the housing opening to move the operating member of the second operating device relative to the housing such that the second operating device is configured to perform a height adjustment operation of a bicycle height adjustable seat post.

7. The bicycle component operating apparatus according to claim 1, wherein
the second operating device includes an attachment part detachably attached to the attachment area of the base member and the operating member of the second operating device having a user interface surface, the user interface surface being configured to face in a rear direction in a state where the bicycle component operating apparatus is mounted on a bicycle.

8. The bicycle component operating apparatus according to claim 1, wherein
the cable is connected to the bicycle height adjustable seat post.

9. The bicycle component operating apparatus according to claim 1, wherein
the first operating device is configured to operate the bicycle transmission component.

10. The bicycle component operating apparatus according to claim 7, wherein
the first operating device is configured to electrically control the bicycle transmission component.

11. The bicycle component operating apparatus according to claim 9, wherein
the first operating device is configured to operate another cable that is connected to the bicycle transmission component.

12. The bicycle component operating apparatus according to claim 1, wherein
the first operating device is configured to operate the bicycle brake component.

13. The bicycle component operating apparatus according to claim 12, wherein
the first operating device is configured to be connected to a fluid hose so as to hydraulically operate the bicycle brake component.

14. A bicycle component operating apparatus comprising:
a first operating device including a base member and an operating member movably arranged with respect to the base member, the first operating device being configured to perform an operation of at least one of a bicycle transmission component and a bicycle brake component, the base member having an attachment area having an attachment area opening having a first axial end with a first center line and a second axial end with a second center line, the first and second center lines being linearly aligned;
a cable configured to operate a bicycle component not including the at least one bicycle transmission component and the bicycle brake component; and
a second operating device connected to the cable and including an attachment part that is detachably disposed in the attachment area opening of the base member, the second operating device further having an operating member and a housing, the operating member of the second operating device extending through a housing opening and being linearly slidable within the housing opening and being linearly slideable within the attachment area opening to actuate the cable.

* * * * *